US010095511B1

(12) United States Patent
Sengupta et al.

(10) Patent No.: US 10,095,511 B1
(45) Date of Patent: Oct. 9, 2018

(54) SYSTEM, METHOD, AND COMPUTER PROGRAM FOR CONVERTING A CURRENT JAVA PROJECT TO A MAVEN PROJECT

(71) Applicant: Amdocs Development Limited, Limassol (CY)

(72) Inventors: Shomi Sengupta, Pune (IN); Sunil Suresh Anvekar, Pune (IN)

(73) Assignee: Amdocs Development Limited, Limassol (CY)

(*) Notice: Subject to any disclaimer, the term of this patent is extended or adjusted under 35 U.S.C. 154(b) by 0 days.

(21) Appl. No.: 15/441,115

(22) Filed: Feb. 23, 2017

(51) Int. Cl.
G06F 9/44 (2018.01)
G06F 8/71 (2018.01)
G06F 11/36 (2006.01)

(52) U.S. Cl.
CPC ............ G06F 8/71 (2013.01); G06F 11/3688 (2013.01)

(58) Field of Classification Search
CPC ..................................................... G06F 8/71
USPC .......................................................... 717/121
See application file for complete search history.

(56) References Cited

U.S. PATENT DOCUMENTS

| 7,506,327 | B2 * | 3/2009 | Kovacs | H04L 67/02 717/144 |
| 8,434,054 | B2 * | 4/2013 | Wagner | G06F 8/71 717/101 |
| 8,635,204 | B1 * | 1/2014 | Xie | G06F 8/74 707/709 |
| 8,813,031 | B2 * | 8/2014 | Agarwal | G06F 8/71 717/121 |
| 8,949,788 | B2 | 2/2015 | Bonnet | |
| 9,170,779 | B2 | 10/2015 | Cushing | |
| 9,354,998 | B2 | 5/2016 | Hyland et al. | |
| 2007/0174814 | A1 | 7/2007 | Komissarchik et al. | |

FOREIGN PATENT DOCUMENTS

| CN | 106095408 A | 11/2016 |
| CN | 106095991 A | 11/2016 |
| CN | 106708509 A * | 5/2017 |

* cited by examiner

*Primary Examiner* — Evral E Bodden
(74) *Attorney, Agent, or Firm* — Zilka-Kotab, P.C.

(57) ABSTRACT

A current Java project is converted to a Maven project, by scanning the the current Java project to identify a structure of the Java project, generating a project template for the Maven project based on the identified structure of the Java project, arranging files associated with the Java project according to a structure of the project template generated for the Maven project, validating dependencies and linkages associated with a plurality of modules of the current Java project based on corresponding module requirements, generating a Project Object Model (POM) file for each of the modules, generating a root POM file for the Maven project that includes the dependencies, executing a build of the Maven project utilizing the POM files and the root POM file to generate artifacts for the Maven project, and deploying the artifacts in a central repository and a testing environment.

14 Claims, 7 Drawing Sheets

To Figure 4

From Figure 3

To Figure 5

SYSTEM, METHOD, AND COMPUTER PROGRAM FOR CONVERTING A CURRENT JAVA PROJECT TO A MAVEN PROJECT

FIELD OF THE INVENTION

The present invention relates to migrating software management projects to Apache Maven, and more particularly to migrating existing Java projects to Maven.

BACKGROUND

Apache Maven is a software project management and comprehension tool. Based on the concept of a project object model (POM), Maven can manage a project's build, reporting, and documentation from a central piece of information. Maven is one of the most widely prescribed tools for build automation within the framework of DevOps.

Maven simplifies and standardizes the project build process. Maven's design regards all projects as having a certain structure and a set of supported task work-flows. Maven relies on a convention on how to define projects and on the list of work-flows that are generally supported in all projects.

One drawback to this approach is that Maven requires a user to first understand what a project is from the Maven point of view, and how Maven works with projects, because what happens when a user executes a phase in Maven is not immediately obvious just from examining the Maven project file. In many cases, this required structure is also a significant hurdle in migrating a mature project to Maven, because it is usually hard to adapt from other approaches.

There is thus a need for addressing these and/or other issues associated with the prior art.

SUMMARY

A system, method, and computer program product are provided for converting a current Java project to a Maven project. In operation, a system identifies a current Java project to convert to a Maven project. The system scans the current Java project to identify a structure of the Java project including identifying a plurality of modules associated with the Java project. The system generates a project template for the Maven project based on the identified structure of the Java project and the plurality of modules associated with the Java project. Further, the system arranges files associated with the Java project according to a structure of the project template for the Maven project. The system validates dependencies and linkages associated with the plurality of modules based on corresponding module requirements. The system generates a Project Object Model (POM) file for each of the plurality modules. Additionally, the system generates a root Project Object Model file for the Maven project. The system generates a build of the Maven project utilizing the generated Project Object Model files for each of the plurality modules and the generated root Project Object Model file to generate artifacts for the Maven project.

DETAILED DESCRIPTION

Figure 1:
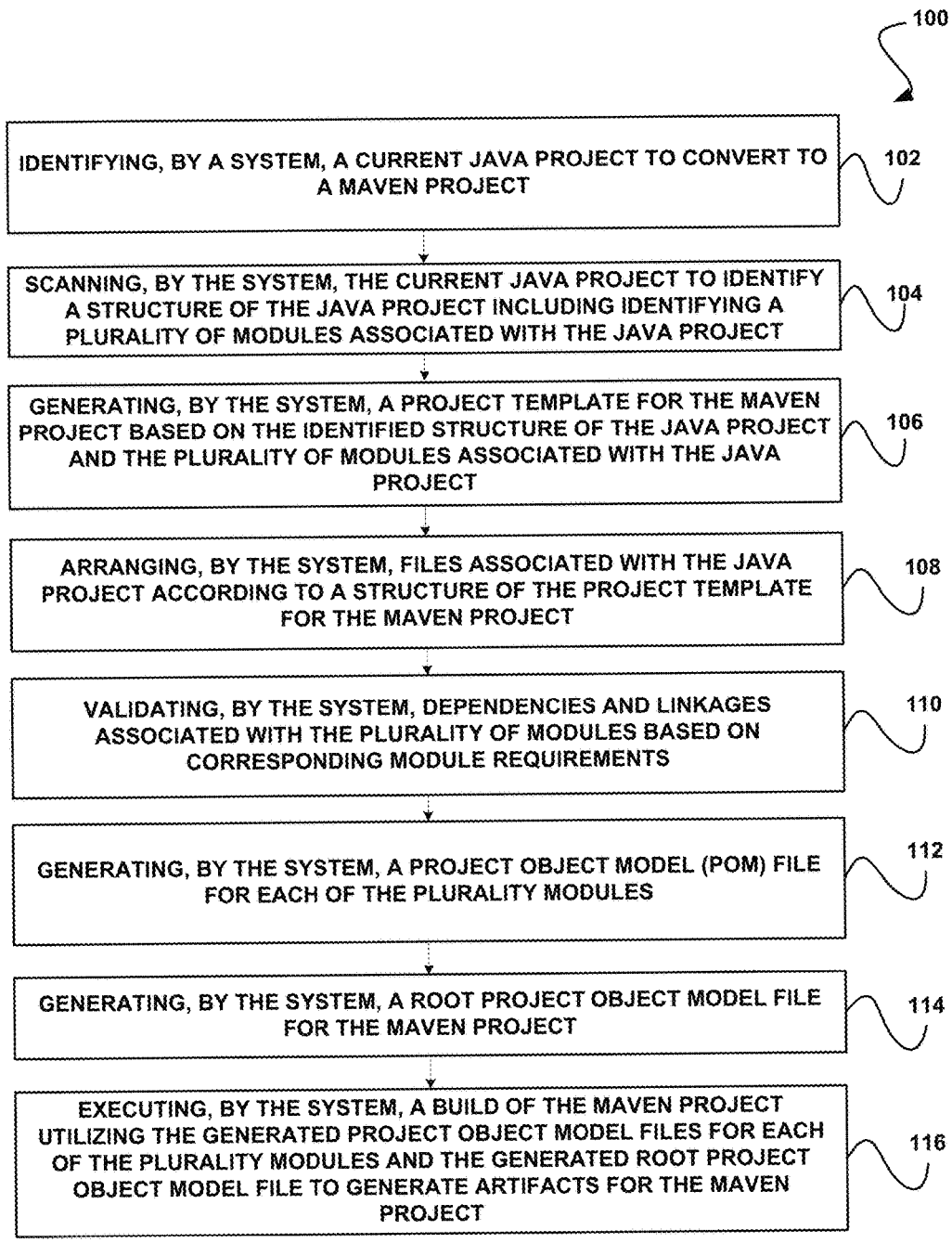
FIG. 1 illustrates a method for converting a current Java project to a Maven project, in accordance with one embodiment.

FIG. 1 illustrates a method 100 for converting a current Java project to a Maven project, in accordance with one embodiment.

In operation, a system (e.g. a migration system, etc.) identifies a current Java project to convert to a Maven project. See operation 102. The Java project may include any software project a user would like migrated to the software project management structure utilized by Apache Maven.

The system scans the current Java project to identify a structure of the Java project, including identifying a plurality of modules associated with the Java project. See operation 104. Scanning the current Java project to identify the structure of the Java project may include identifying dependencies and linkages associated with the plurality of modules and/or identifying resources required by the plurality of modules.

Further, in one embodiment, scanning the current Java project to identify the structure of the Java project may include identifying third party dependencies associated with the plurality of modules. In this case, the system may move data associated with the third party dependencies to one or more repositories accessible by the plurality of modules.

The system generates a project template for the Maven project based on the identified structure of the Java project and the plurality of modules associated with the Java project. See operation 106.

Further, the system arranges files associated with the Java project according to a structure of the project template for the Maven project. See operation 108.

The system validates dependencies and linkages associated with the plurality of modules based on corresponding module requirements. See operation 110.

Furthermore, the system generates a Project Object Model (POM) file for each of the plurality modules. See operation 112.

Additionally, the system generates a root Project Object Model file for the Maven project. See operation 114.

The system generates a build of the Maven project utilizing the generated Project Object Model files for each of the plurality modules and the generated root Project Object Model file to generate artifacts for the Maven project. See operation 116. The generated artifacts include EAR (Enterprise Application aRchive) files.

In one embodiment, the method 100 may include the system automatically triggering an automated regression test suite to perform regression testing of the Maven project.

The method 100 allows a system to automatically migrate an existing mature Java project into the Maven framework, thus making the process of migration seamless and effortless. This allows a developer to focus on business issues rather than on technical nuisances of the Maven structure.

It should be noted that the method 100 may be implemented utilizing various systems, hardware, software, applications, user interfaces, etc., as dictated by the implementer. For example, the system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
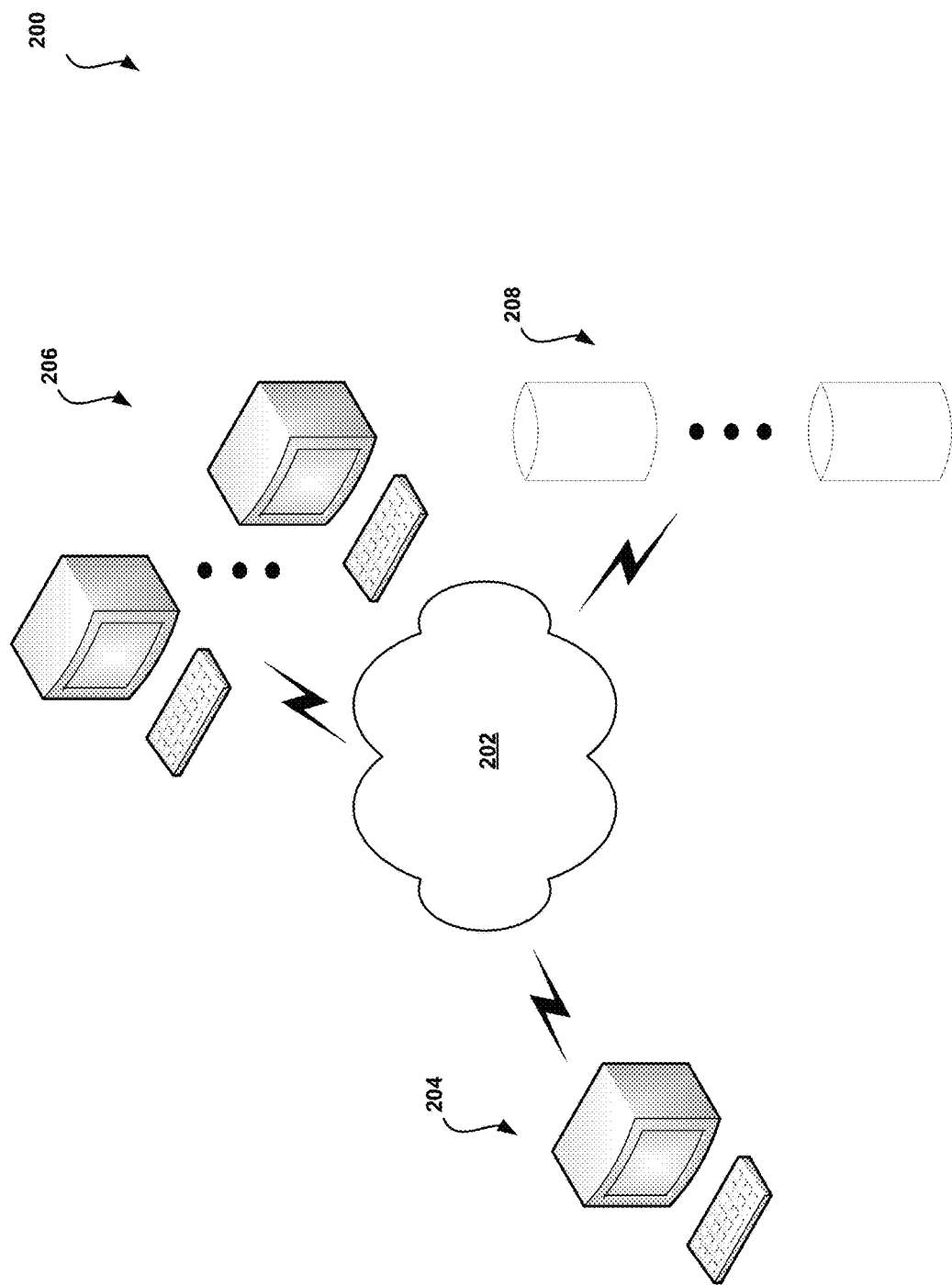
FIG. 2 shows a system for converting a current Java project to a Maven project, in accordance with one embodiment.

FIG. 2 shows a system 200 for converting a current Java project to a Maven project, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a migration system 204, which may implement a variety of applications or software, etc. The migration system 204 may be capable of communicating with a plurality of systems 206, either directly or over one or more networks 202, for migrating Java projects to Maven.

The migration system 204 is also in communication with one or more repositories/databases 208, which may serve as a storage areas for Maven projects that the systems 206 may access.

The migration system 204 will simplify the migration of existing Java projects into the Maven framework automatically, allowing a software project to be ready for continuous delivery as part of an overall DevOps framework.

In operation, the migration system 204 scans a current Java project to identify the structure. This may include identifying dependencies and resources, etc. The migration system 204 then creates a base Maven project for each of the modules scanned (i.e. a template).

Further, the migration system 204 moves the various files associated with the Java project according to the Maven structure. The migration system 204 moves any third party dependencies to the appropriate repositories (e.g. customized repositories, etc.).

The migration system 204 validates the dependencies and linkages based on the module requirements. In doing so, class paths of the projects are not disturbed. The migration system 204 generates Project Object Model (POM) XML files for each module. The migration system 204 also generates a root (parent) POM XML file.

The migration system 204 then executes the build using the generated POMs to generate the artifacts (i.e. EAR files). The migration system 204 deploys the artifacts in the central repositories and testing environments. The migration system 204 may also trigger an automated regression test suite. In various embodiments, the migration system 204 may interface with any automated testing tools, such as QuickTest Professional (QTP) or load runner, etc.

The migration system 204 generates build scripts, which are easier to read and maintain over a long period of time. Also, updating the Java modules will only require minimum changes to be made to the POM XMLs.

The migration system 204 will work for both J2EE and web applications. The migration system 204 can read the existing folder structure of Java J2EE.

Figure 3:
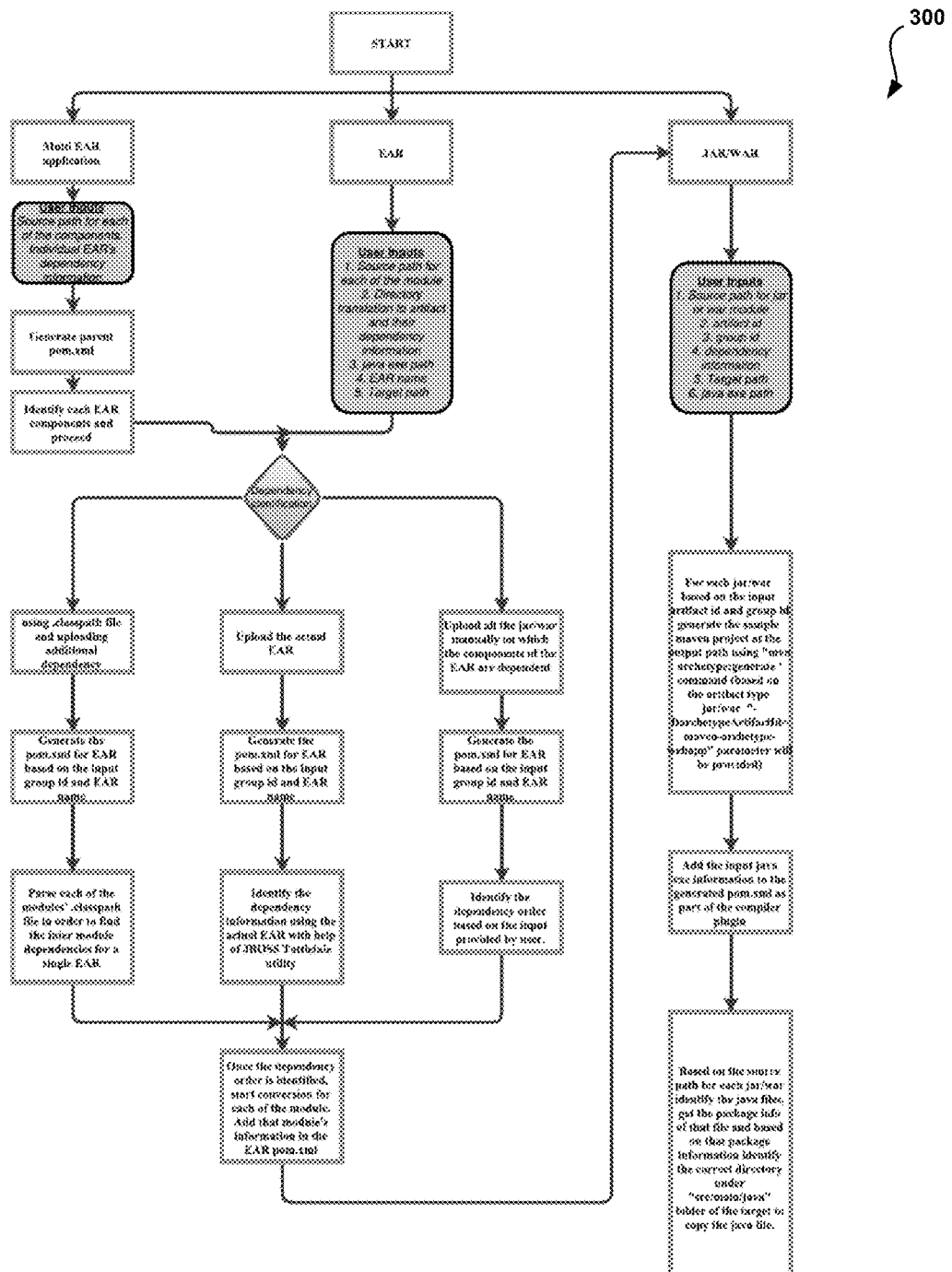
FIGS. 3-5 show a flow chart for converting a current Java project to a Maven project, in accordance with one embodiment.
Figure 4:
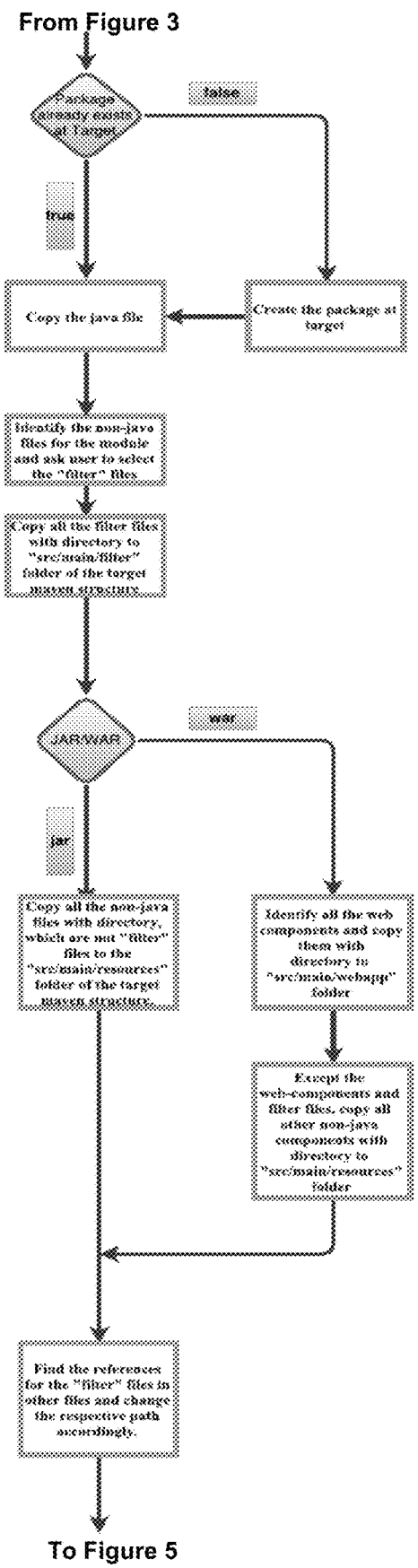
Figure 5:
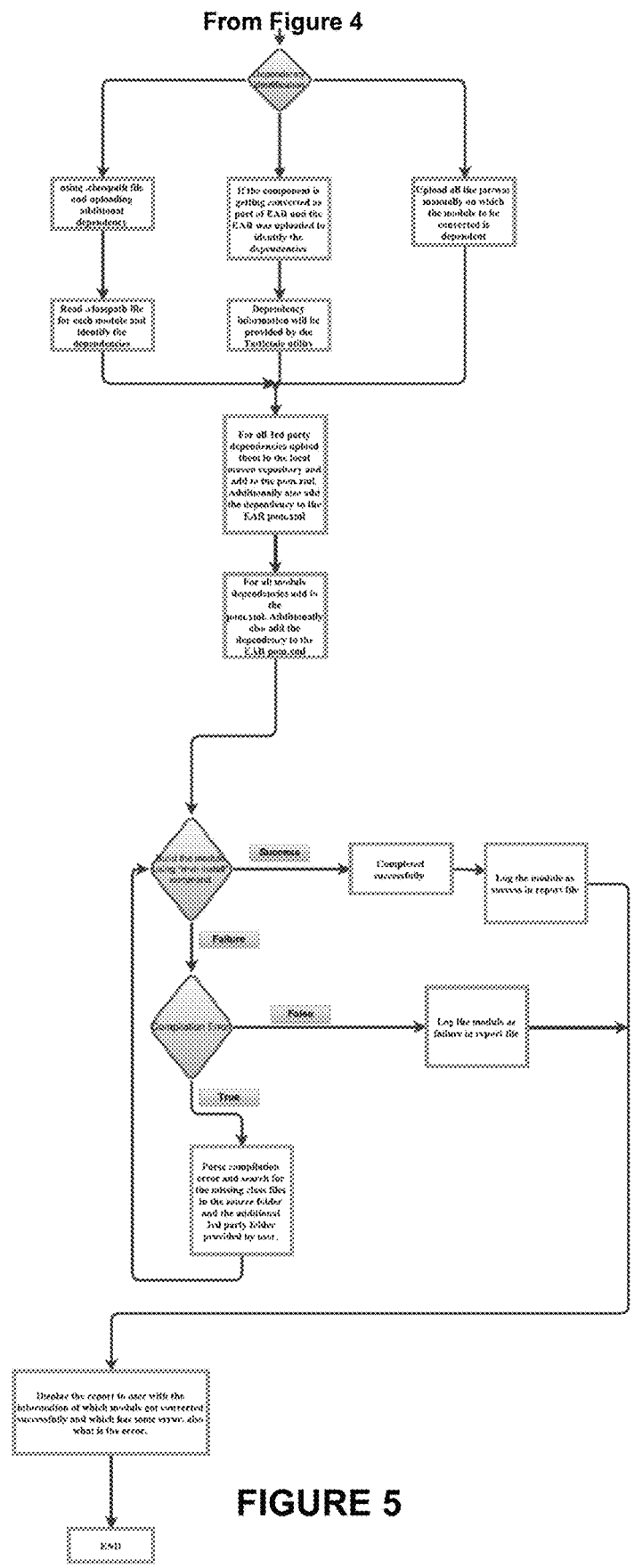

FIGS. 3-5 show a flow chart 300 for converting a current Java project to a Maven project, in accordance with one embodiment. As an option, the flow chart 300 may be implemented in the context of the details of the previous figures and/or any subsequent figure(s). Of course, however, the flow chart 300 may be implemented in the context of any desired environment. Further, the aforementioned definitions may equally apply to the description below.

As shown, a migration system may convert a Java project to a Maven project by receiving multiple EAR applications, a single EAR application, and/or JAR/WAR files. For multiple EAR applications, a user may provide the migration system with a source path for each of the components as input. Additionally, individual EAR dependency may be provided as input to the migration system. In one embodiment, the migration system may identify all of this information automatically. The migration system generates a parent POM file and identifies each EAR component.

For a single EAR file, a user may provide the migration system with a source path for each of the modules as input. Further, directory translation to artifacts and their dependency information may be provided to the migration system. Additionally, a Java exe path, EAR name, and a target path may also be provided. In one embodiment, the migration system may identify all of this information automatically.

The migration system then performs dependency identification. Once the dependency order is identified, the migration system begins conversion for each module.

For JAR/WAR files, a user may provide the migration system with a source path for JAR or WAR modules, artifact ID information, group ID information, dependency information, target path information, and/or a Java exe path. In one embodiment, the migration system may identify this information automatically.

The migration system generates a sample (i.e. template) Maven project for each JAR/WAR based on the artifact ID and the group ID. The input Java exe information is then added to the generated POM file as part of a compiler plugin.

The migration system then, based on the source path for each JAR/WAR, identifies the Java files and obtains the package information of that file, and based on that package information, identifies the correct directory under a folder of the target to copy the Java file. Further, it is determined whether the package already exists at the target (see FIG. 4). If it does not, the package is created at the target.

The migration system identifies the non-Java files for the module and may prompt the user to select the "filter" files. The migration system copies all the filter files with a directory to a folder of the target Maven structure. Further, the migration system finds the references for the "filter" files in other files and changes the respective path accordingly.

The migration system then performs dependency identification (see FIG. 5). For all third party dependencies, the migration system uploads them to the local Maven repository and adds to the POM. Additionally, the dependency is added to the EAR file. The migration system adds all module dependencies to the POM file and also adds the dependency to the EAR file.

The migration system then builds the module using "mvn install" command. The migration system displays a report to the user with information of which modules were converted successfully and which modules have errors (and also indicating the error).

Figure 6:
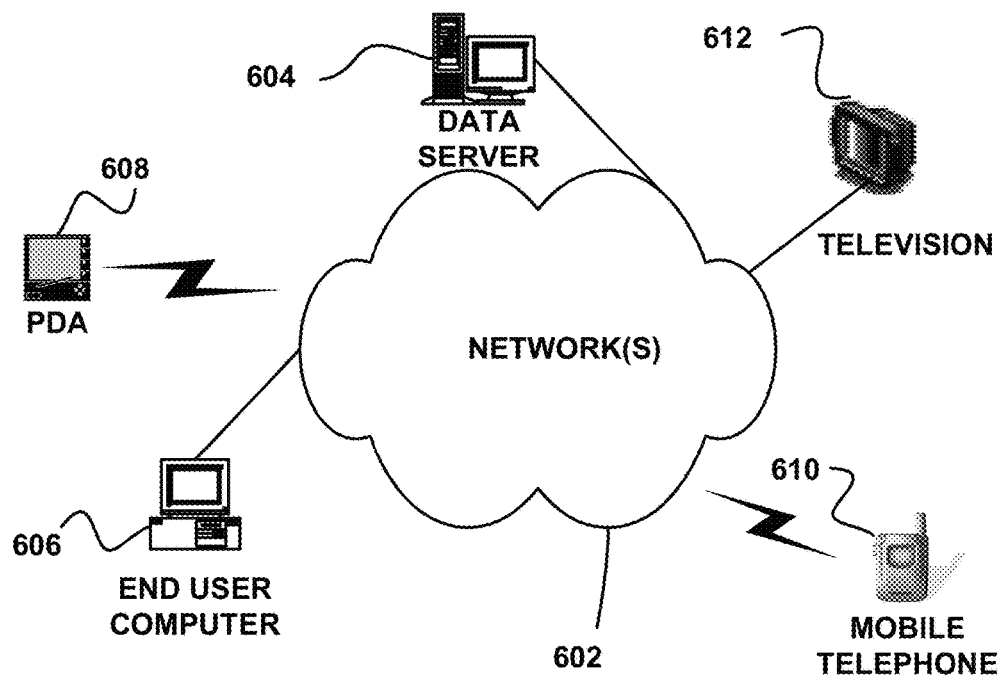
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
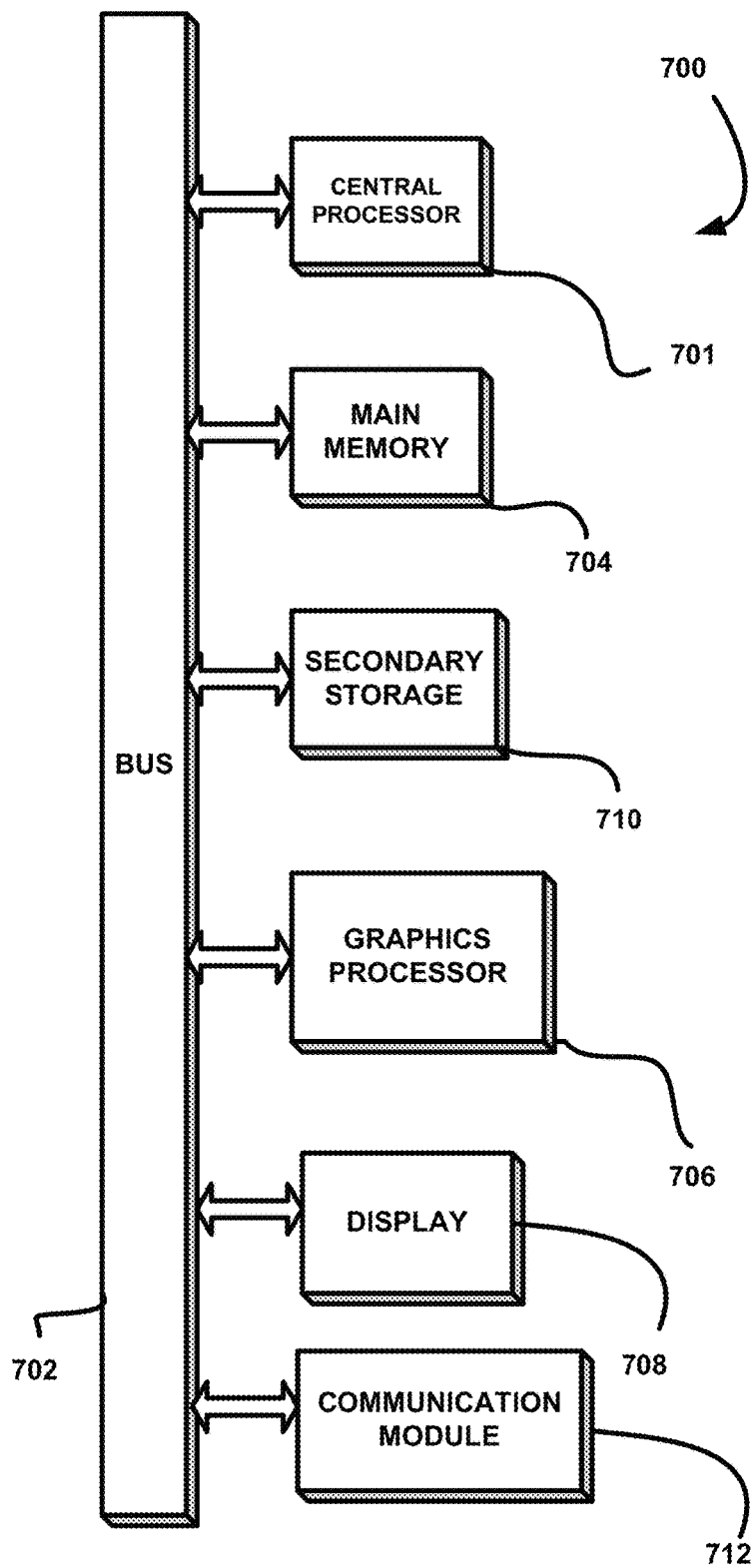
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 707.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a system, a current Java project to convert to a Maven project;
   scanning, by the system, the current Java project to identify a structure of the Java project including:
      a plurality of modules associated with the Java project,
      dependencies and linkages associated with the plurality of modules, and
      resources required by the plurality of modules;
   generating, by the system, a project template for the Maven project based on the identified structure of the Java project;
   arranging, by the system, files associated with the Java project according to a structure of the project template generated for the Maven project, including:
      storing a copy of each of the files in a corresponding folder of the project template,
      identifying, in the files, references to one or more of the files, and
      changing a path for each of the identified references;
   validating, by the system, the dependencies and linkages associated with the plurality of modules based on corresponding module requirements;
   generating, by the system, a Project Object Model (POM) file for each module of the plurality modules;
   generating, by the system, a root POM file for the Maven project that includes the dependencies;
   executing, by the system, a build of the Maven project utilizing the POM files generated for the plurality modules and the root POM file to generate artifacts for the Maven project;
   deploying, by the system, the artifacts in a central repository and a testing environment.

2. The method of claim 1, further comprising triggering, by the system, an automated regression test suite to perform regression testing of the Maven project.

3. The method of claim 1, wherein the structure of the Java project further includes third party dependencies associated with the plurality of modules.

4. The method of claim 3, further comprising moving, by the system, data associated with the third party dependencies to one or more repositories accessible by the plurality of modules.

5. The method of claim 1, wherein the generated artifacts include EAR (Enterprise Application aRchive) files.

6. A computer program product embodied on a non-transitory computer readable medium, comprising computer code for:
   identifying, by a system, a current Java project to convert to a Maven project;
   scanning, by the system, the current Java project to identify a structure of the Java project including:
      a plurality of modules associated with the Java project,
      dependencies and linkages associated with the plurality of modules, and
      resources required by the plurality of modules;
   generating, by the system, a project template for the Maven project based on the identified structure of the Java project;
   arranging, by the system, files associated with the Java project according to a structure of the project template generated for the Maven project, including:
      storing a copy of each of the files in a corresponding folder of the project template,
      identifying, in the files, references to one or more of the files, and
      changing a path for each of the identified references;
   validating, by the system, the dependencies and linkages associated with the plurality of modules based on corresponding module requirements;
   generating, by the system, a Project Object Model (POM) file for each module of the plurality modules;
   generating, by the system, a root POM file for the Maven project that includes the dependencies;
   executing, by the system, a build of the Maven project utilizing the POM files generated for the plurality modules and the root POM file to generate artifacts for the Maven project;
   deploying, by the system, the artifacts in a central repository and a testing environment.

7. The computer program product of claim 6, further comprising computer code for triggering, by the system, an automated regression test suite to perform regression testing of the Maven project.

8. The computer program product of claim 6, wherein the structure of the Java project further includes third party dependencies associated with the plurality of modules.

9. The computer program product of claim 8, further comprising computer code for moving, by the system, data associated with the third party dependencies to one or more repositories accessible by the plurality of modules.

10. The computer program product of claim 6, wherein the generated artifacts include EAR (Enterprise Application aRchive) files.

11. A system comprising one or more processors operable for:
   identifying, by the system, a current Java project to convert to a Maven project;
   scanning, by the system, the current Java project to identify a structure of the Java project including:

a plurality of modules associated with the Java project, dependencies and linkages associated with the plurality of modules, and resources required by the plurality of modules;

generating, by the system, a project template for the Maven project based on the identified structure of the Java project;

arranging, by the system, files associated with the Java project according to a structure of the project template generated for the Maven project, including:

storing a copy of each of the files in a corresponding folder of the project template, identifying, in the files, references to one or more of the files, and changing a path for each of the identified references;

validating, by the system, the dependencies and linkages associated with the plurality of modules based on corresponding module requirements;

generating, by the system, a Project Object Model (POM) file for each module of the plurality modules;

generating, by the system, a root POM file for the Maven project that includes the dependencies;

executing, by the system, a build of the Maven project utilizing the POM files generated for the plurality modules and the root POM file to generate artifacts for the Maven project;

deploying, by the system, the artifacts in a central repository and a testing environment.

12. The system of claim 11, wherein the one or more processors are further operable for triggering, by the system, an automated regression test suite to perform regression testing of the Maven project.

13. The system of claim 11, wherein the structure of the Java project further includes third party dependencies associated with the plurality of modules.

14. The system of claim 13, wherein the one or more processors are further operable for moving, by the system, data associated with the third party dependencies to one or more repositories accessible by the plurality of modules.

* * * * *